United States Patent
Kratzsch et al.

(10) Patent No.: US 6,822,188 B1
(45) Date of Patent: Nov. 23, 2004

(54) METHOD FOR SHAPING MATERIALS WITH PLASMA-INDUCING HIGH-ENERGY RADIATION

(75) Inventors: Christian Kratzsch, Düsseldorf (DE); Wolfgang Schulz, Langerwehe (DE); Peter Abels, Alsdorf (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/807,061
(22) PCT Filed: Mar. 13, 1999
(86) PCT No.: PCT/DE99/00697
  § 371 (c)(1),
  (2), (4) Date: Jul. 9, 2001
(87) PCT Pub. No.: WO00/20158
  PCT Pub. Date: Apr. 13, 2000

(30) Foreign Application Priority Data

Oct. 7, 1998 (DE) .......................................... 198 46 191

(51) Int. Cl.⁷ .............................................. B23K 26/03
(52) U.S. Cl. .............................. 219/121.64; 219/121.83
(58) Field of Search .................. 250/503.1; 219/121.62, 219/121.63, 121.64, 121.83; 356/318

(56) References Cited

U.S. PATENT DOCUMENTS 5,151,608 A * 9/1992 Torii et al. .................. 250/561
5,283,416 A * 2/1994 Shirk ..................... 219/121.83
5,360,960 A * 11/1994 Shirk ..................... 219/121.83
5,506,386 A * 4/1996 Gross ..................... 219/121.64
5,607,605 A * 3/1997 Musasa et al. ......... 219/121.64
5,651,903 A * 7/1997 Shirk ..................... 219/121.64
5,961,859 A * 10/1999 Chou et al. ............. 219/121.63

FOREIGN PATENT DOCUMENTS

DE 4434409 4/1996
DE 19618045 11/1997
DE 19741329 10/1998

* cited by examiner

Primary Examiner—Lamson Nguyen
Assistant Examiner—Blaise Mouttet
(74) Attorney, Agent, or Firm—Pandiscio & Pandiscio

(57) ABSTRACT

A method for materials processing by means of plasma-inducing high-energy radiation, especially laser radiation, in which the instantaneous intensity of the plasma radiation is measured at plural locations of a vapor capillary. So that the method can also be performed with perfect welding results on workpieces of very small thickness, shapes of two spaced-apart peak intensity regions, or of another type of electromagnetic radiation emitted from the vapor capillary, and of a minimum region that can be formed between these two regions of extreme values are detected metrologically, the so detected shapes of the regions of extreme values are compared with predetermined region shapes, and control of the materials processing operation takes place as a function of deviations of the detected shapes from the predetermined region shapes.

1 Claim, 5 Drawing Sheets

METHOD FOR SHAPING MATERIALS WITH PLASMA-INDUCING HIGH-ENERGY RADIATION

Figure 1:
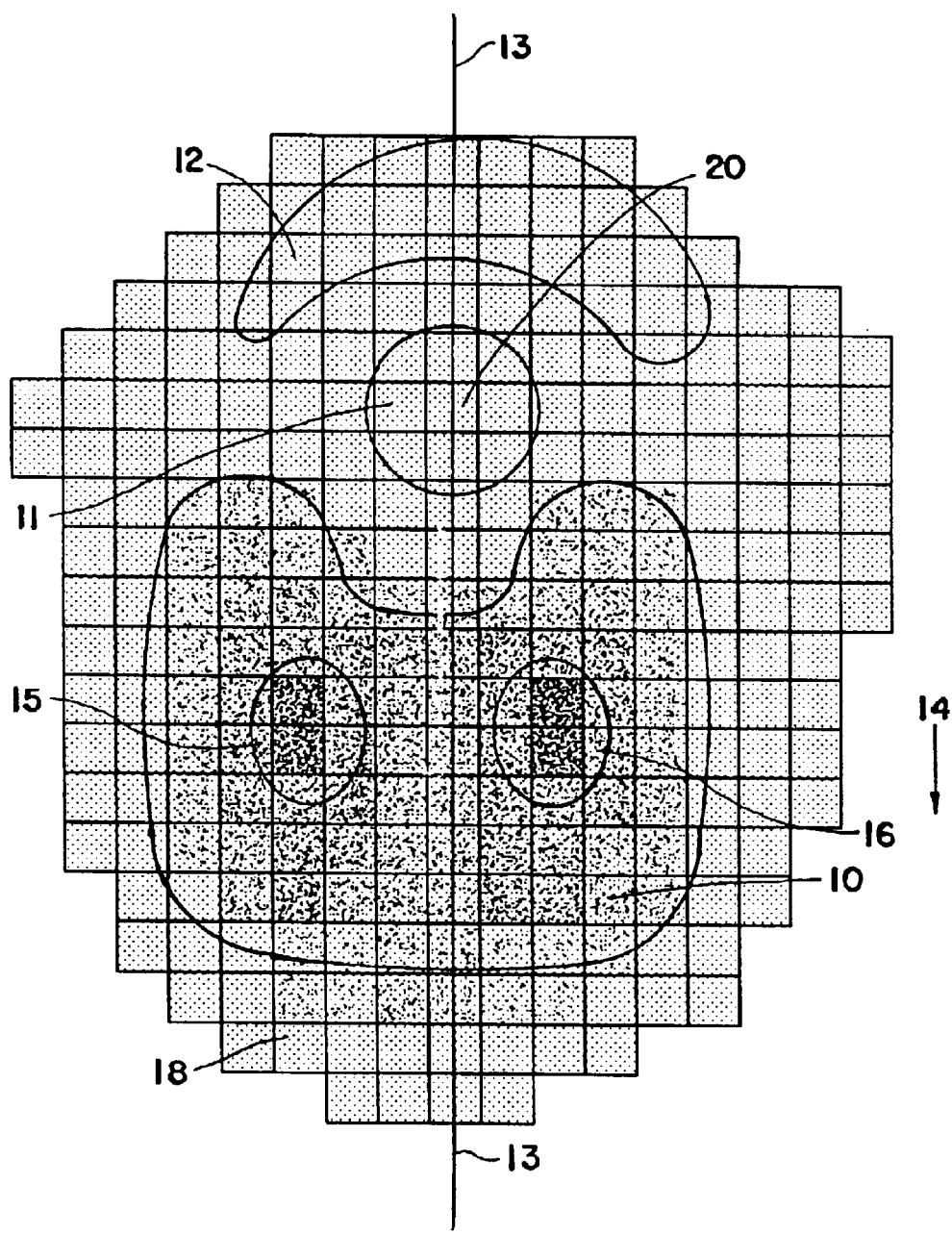

The invention relates to a method for materials processing by means of plasma-inducing high-energy radiation, especially laser radiation, in which the instantaneous intensity of the plasma radiation is measured at plural locations of a vapor capillary.

A method having the aforesaid features is known from DE 197 41 329 C1, wherein, instantaneous plasma intensities are measured parallel to an axis of an induced radiation at at least two measuring points. The measured plasma intensities are assigned to predetermined capillary geometry variables, i.e., for example, the depth of the vapor capillary, and control of the materials processing operation takes place as a function of these capillary geometry variables. This method utilizes a direct correlation between the observed plasma intensity and the formation of the vapor capillary to eliminate process errors by improved direct process monitoring. It has now been ascertained that this method is not applicable if the depth of the vapor capillary is comparable to its width. The analyzable relationship between plasma intensity and depth of penetration is no longer present.

By contrast, the object of the invention is to improve a method having the features cited in the introduction hereto in such a way that control of the materials processing operation can be influenced by direct process monitoring even when the depth of the plasma capillary is comparable to its width.

This object is accomplished in that shapes of two spaced-apart peak-intensity regions of the plasma radiation, or of another type of electromagnetic radiation emitted from the vapor capillary, and of a minimum region that can be formed between these two regions of extreme values are detected metrologically, in that metrologically detected shapes of the regions of extreme values are compared with predetermined region shapes, and in that control of the materials processing operation takes place as a function of deviations of the detected shapes from the predetermined region shapes.

It is important for the invention that exclusively areal analysis of the instantaneous plasma intensities of the detection region is performed. Another type of emitted electromagnetic radiation can be analyzed instead of the plasma radiation, for example emitted thermal radiation. Out of the metrologically detected region as a whole, shapes of predetermined regions are detected and analyzed. The predetermined regions are primarily peak-intensity regions. Such peak-intensity regions emerge laterally with respect to the axis of the laser beam. They are disposed roughly on a straight line perpendicular to the axis of the laser beam and identify a leading region at the edge of the vapor capillary and a trailing region at the edge of the same vapor capillary. A metrologically detectable minimum region may form between the two, depending on the conduct of the method. The shape of this minimum region can also be compared to a predetermined region shape and control of the materials processing operation can take place in accordance with the results of comparison of all the regions exhibiting extreme values. Since the method involves solely the analysis of planar shapes, it is independent of any metrologic detection of the depth of penetration of the vapor capillary, and is therefore especially well suited to thin workpieces. Materials processing by means of high-energy radiation can also be performed with on-line quality monitoring. This is possible especially in the welding of thin workpieces of unequal thickness, as in the case of so-called "tailored blanks." In this case, the different thicknesses and coatings and the different properties of the materials necessitate special measures in the conduct of the method. A known characteristic feature in the welding of unequally thick workpieces is the lateral offset of the edges of the joint relative to the center of the weld seam. Even when the laser beam passes along the joint edge in an ideal manner, the weld seam forms with a lateral offset from the prepared joint edges. This offset must assume a set value. If the weld seam is situated farther into the thicker workpiece, the molten volume increases and the joint gap can be filled satisfactorily. If the weld seam is situated too far into the thick workpiece, the thin workpiece will not be melted adequately. If the weld seam is situated farther into the thinner workpiece, the overall molten volume decreases and the thicker workpiece is not melted through its entire thickness. Undesired undercuts are the result. The above-described undesirable method results can be controlled effectively by means of the previously described method steps, since differently fused workpieces are distinguishable by the different shapes of their regions of extreme values.

The method can be performed in such a way that control of the materials processing operation takes place when the shape of the minimum region deviates from a predetermined near-circular region shape. Such a method is important especially in cases where there is a minimum region that can be detected metrologically. Deviations from near-circular region shapes can cause welding defects and are, on the other hand, used to control the materials processing operation.

An improvement of the method that is designed to eliminate the above-described susceptibility to defects can be performed in such a way that control of the materials processing operation takes place when sharp regional boundaries are present in the regions of transition from the shape of the minimum region to the shapes of the peak regions. At the sharp boundaries between the shape of the minimum region and the brighter peak regions there is a joint edge that has not yet been melted by the laser beam. Thus, in a case where the values of the joint gap are not too great, for example one of the regions of extreme values may deviate from the predetermined region shape. For instance, a peak region is interrupted, i.e., darker in the region of a joint edge. The second peak region may then still be brighter, thereby indicating that the weldment joint is still present on the full width of the weld seam. In this case, the joint gap can still be spanned by means of the welding method. However, the observed deviations from the predetermined values do cause weld flaws, undercuts or even breakdown of the seam, in which too little molten material is present.

If the method is performed so that control of the materials processing operation takes place when the shape of a peak-intensity region that is in a leading position (in the feed direction) with respect to a workpiece that is being processed and is moving relative to the laser radiation and the shape of a trailing peak region deviate from predetermined region shapes. An improvement of the welding results can be achieved in this manner, in a case where the values of the joint gap are excessive, by the fact that not only is the leading peak-intensity region analyzed, but the trailing peak region is also analyzed simultaneously. By suitable control of the materials processing operation, the welding results are therefore also improved if both peak regions are interrupted by a minimum region along the joint edge.

Sufficient welding precision can also be achieved if control of the materials processing operation takes place when the deviation in shape exceeds a predetermined difference magnitude and/or a predetermined duration. Thus, the deviations must be of a set magnitude and must be detected for a set length of time. If they are not, no intervention is made in the welding process, so as to avoid burdening the control apparatus unnecessarily.

A further feasible way of developing the method can be to have the control of the materials processing operation take place as a function of angular positions assumed by a straight line passing through the peak-intensity regions with respect to a feed direction of the workpiece that is being processed and is moving relative to the laser radiation. Angular positions of a straight line can be detected with very little metrologic outlay and can be used for materials processing with little outlay for computer support.

A further feasible approach is to have the control of the materials processing operation take place when sporadically occurring, intensely radiating light spots are detected in a region of measurement that is detecting the shapes of the regions of extreme values by metrologic means. Such light spots indicate weld spatters that decrease the volume of the weld seam. The turbulence associated with such spatters can result in irregular weld beads.

The methods described hereinabove can be refined so that the control of materials processing in the case of workpieces having different thicknesses takes place when the minimum region deforms the peak region that is leading or trailing in the feed direction. Such deformation can occur in particular when the minimum region is well-defined owing to good root penetration. In this case, the deformation of the leading peak region signifies an undesirable deviation of the path of the laser beam into the thinner workpiece. Deformation of the trailing peak region, on the other hand, signifies an undesirable deviation of the path of the laser beam into the thicker workpiece. Both potentially undesirable deviations can be eliminated by control.

The method can also be performed in such a way that control of the materials processing operation takes place when two submaxima present on both sides of a joint path in a peak region that is in the leading position in the feed direction deviate from a predetermined symmetry. Symmetrical submaxima of the leading peak region occur particularly in the case of dummy welds, where there is consequently no joint gap between the joint edges and like materials are being processed. The presence of a joint gap, on the other hand, results in an asymmetry, which, however, can also be viewed as a predetermined symmetry in certain cases.

The method steps described hereinabove make it possible to obtain a good weldment from thin workpieces. Such a good weldment of sheet-stock workpieces or thin metal sheets is present when the lateral offset between the joint edges and the weld seam being produced has a set value, when the joint gap is completely filled with molten material and thus can be spanned connectingly, when at least one root penetration—or more—is present, when the upper bead and the lower bead of the weld seam being produced have widths of set values, and when dimensional stability can be preserved throughout the welding process. These characteristics of a good weldment are to be reflected in quality and quantity in the relative positions and the shapes of the three intensity regions described hereinabove. Said characteristics are present to their full extent when each of the three regions has a predetermined shape, when the dark, third region, i.e. the minimum region, has a rounded shape, when the dark region is visible, when the bright, first region (upper bead) and the dark, third region (lower bead) have a width of a predetermined value, and when temporal and spatial deviations remain small. Concerning the visibility of the dark region, it should be noted that root penetration can, unfortunately, be present when the dark third region is not yet visible. Here, visibility of the third, dark region is only a necessary prerequisite for root penetration. Of course, root penetration is detected reliably when the dark, third region is visible.

Figure 2:
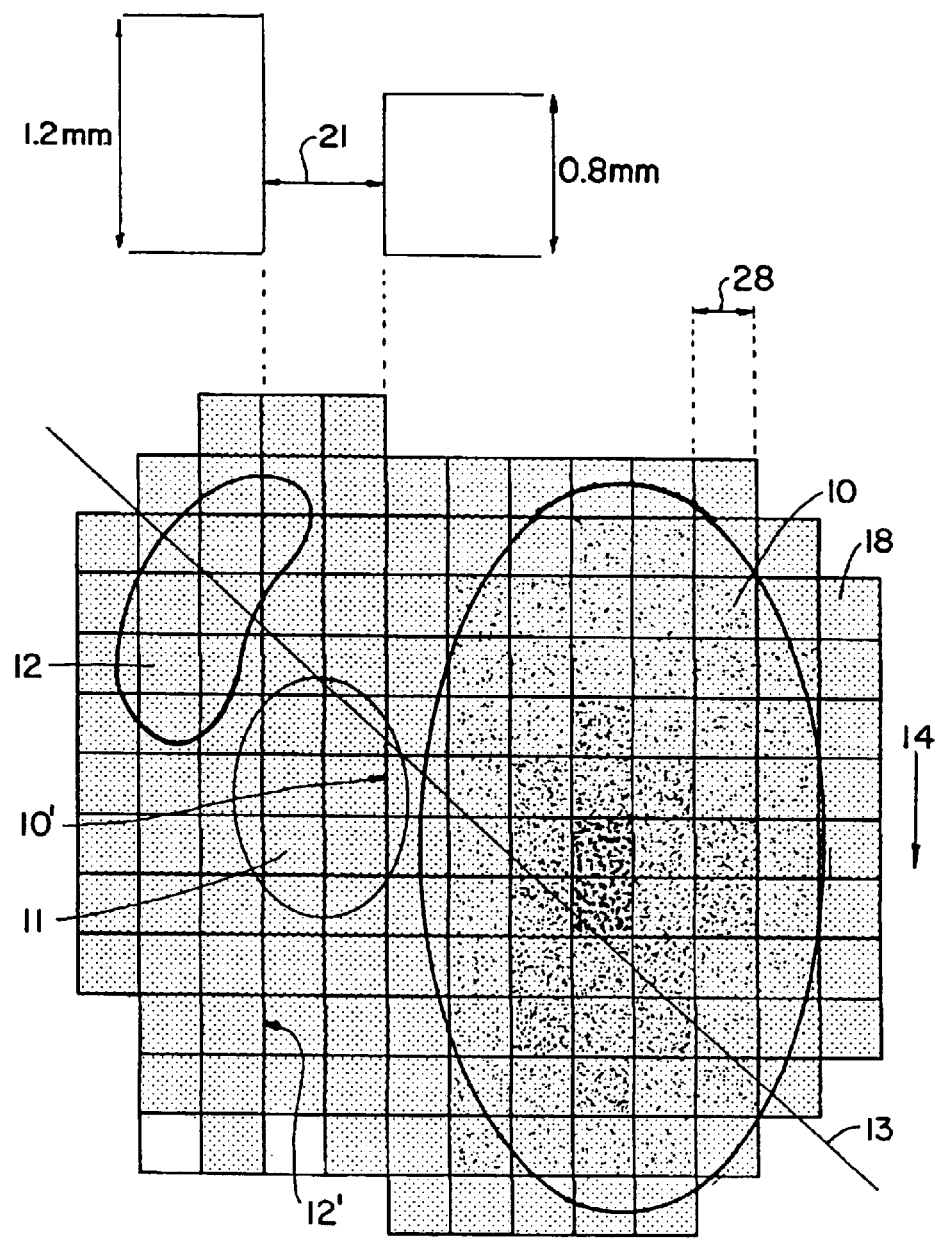
Figure 3C:
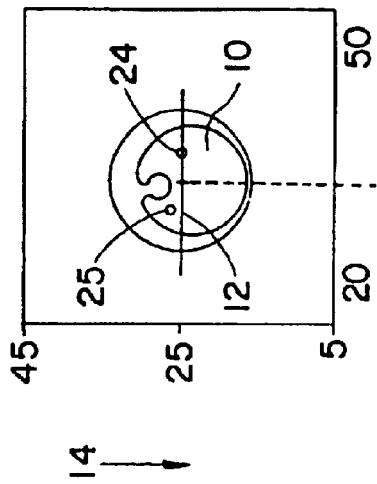
Figure 3C:
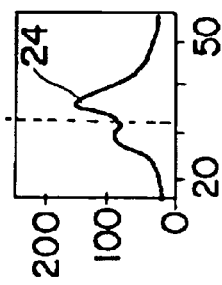
Figure 3A:
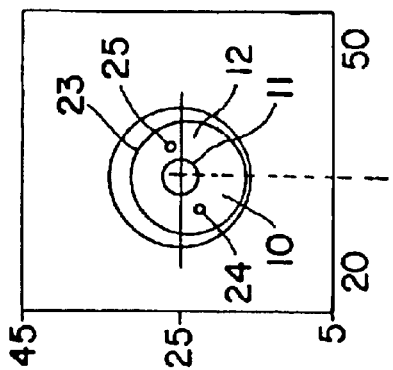
Figure 3A:
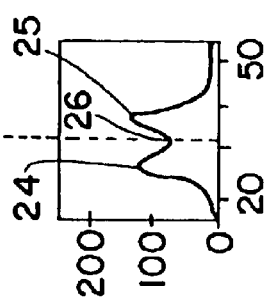
Figure 3B:
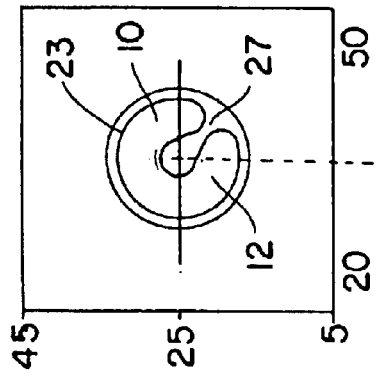
Figure 3B:
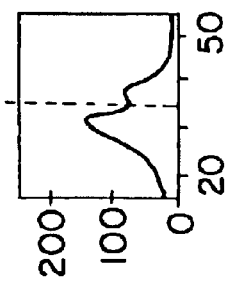
Figure 4B:
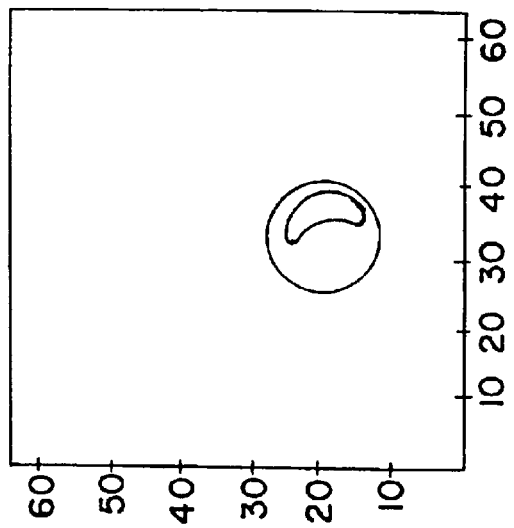
Figure 4A:
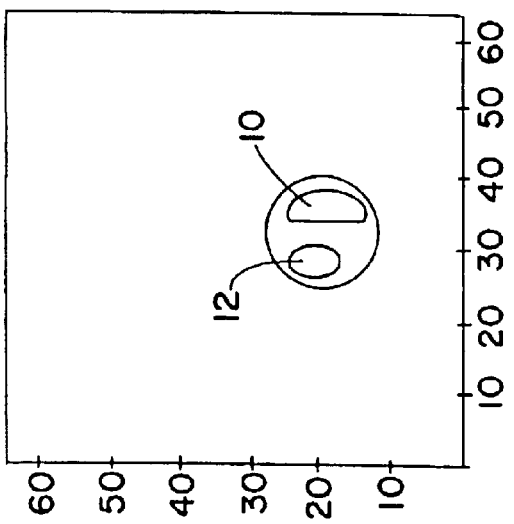
Figure 6:
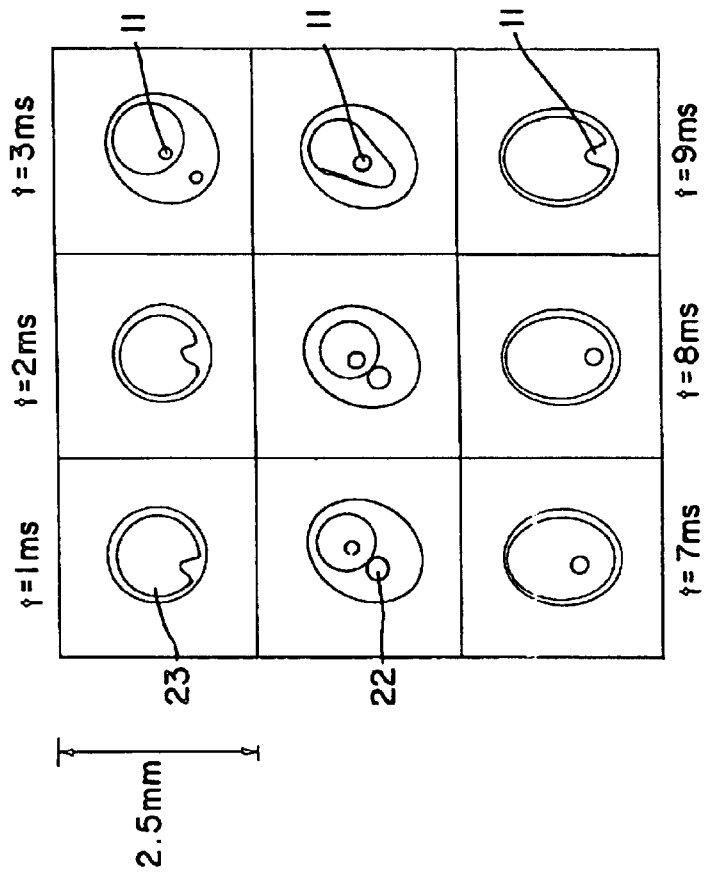
Figure 5A:
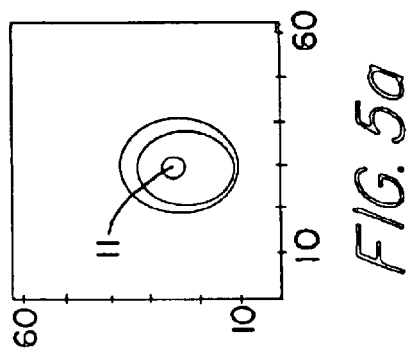
Figure 5B:
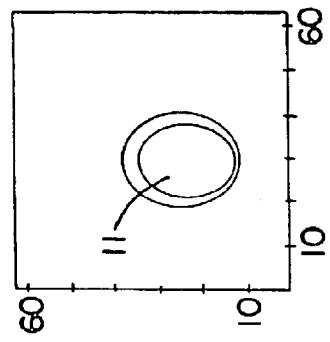

The invention is explained with reference to the illustrations provided in the drawings, wherein:

FIG. 1 is a schematic representation of a brightness distribution, produced by an image generator, of a vapor capillary in the case of a dummy weld, FIG. 2 is a representation equivalent to that of FIG. 1 in the case of the welding of workpieces of unequal thickness with a gap between them, FIGS. 3*a* to 3*c* are schematic representations of brightness distributions in the region of a vapor capillary under different processing conditions, FIGS. 3*a'* to 3*c'* are intensity distributions, assignable to FIGS. 3*a* to 3*c*, over the cross sections of the coordinate lines plotted in FIGS. 3*a* to 3*c*, FIGS. 4*a* and 4*b* are schematic representations concerning the detection of gaps between workpieces, FIGS. 5*a* and 5*b* are schematic representations concerning the detection of good and poor root penetration, FIG. 6 is a schematic representation concerning the detection of spattering.

All the figures show schematic representations produced by an image generator. A suitable image generator is a CCD [charge-coupled device] camera detecting a set region of measurement that encompasses the vapor capillary. The individual pixels 18 for the detected region of measurement can be seen in FIGS. 1 and 2. The more densely dotted a given pixel is shown to be, the greater the intensity of the plasma radiation detected by CCD camera's sensor cell assignable to that pixel 18. In FIGS. 3 to 6, the individual pixels are not shown.

All the figures relate to process monitoring during the welding of tailored blanks. Tailored blanks are fabricated from thin metal sheets that either are of the same thickness or are of different thicknesses in the region of the weld seam. FIG. 1 shows a representation based on the production of a dummy weld in feed direction 14. In this case there is no joint gap between the joint edges of the workpieces to be welded (not shown). FIG. 1 shows that the joint line formed by the two workpieces therefore coincides with a straight line 13 passing symmetrically through two peak-intensity regions 10, 12. Regions 10, 12 are located on both sides of the laser beam axis, which is roughly at location 20. Thus, the first region 10 is leading and the second region 12 trailing with respect to the laser beam axis 20. The first bright region 10 and the second bright region 12 indicate the leading and trailing position and the extent of the edge of the vapor capillary, and not the locations with the greatest depth of penetration. At the site of the greatest depth of penetration, i.e. roughly in the region of the laser beam axis 20, a third region can be seen, i.e., a dark, third region 11 where the intensity values are especially low.

It is further important for the analysis that the brightest region 10 forward of the laser beam axis 20 have a substructure consisting of two spatially bounded submaxima 15, 16 on the right forward and on the left forward of the laser beam axis 20, i.e., symmetrically with respect to straight line 13. Only when there is no joint gap between the joint edges and like materials are being processed (dummy welding) is this symmetry with respect to feed direction 14 also present in the intensity of the first region 10. Depending on the width of the joint gap, the feed rate, the different thicknesses of the materials to be joined, and the characteristics of said materials, a predetermined value must be set for the asymmetry of the first region 10 if a good weldment is to be obtained.

At the top of FIG. 2 is a rough diagram of the arrangement of two workpieces of different thicknesses, i.e., respectively 1.2 mm and 0.8 mm. The two workpieces are spaced apart horizontally, resulting in the formation of a corresponding joint gap 21. The joint gap, which usually varies ranges from 0 to 0.3 mm, measures about 120 $\mu$m in the case shown, as can be seen from the pixel width of 60 $\mu$m identified by reference numeral 28. Here again, two peak-intensity regions 10, 12 are present and a minimum region 11 is located between the two. All the regions 10, 11, 12 lie roughly on a straight line 13 disposed at an angle to a joint path and thus to the path of gap 21, hence the feed direction 14. The angular position of straight line 13 depends primarily on the width of the gap 21 and the dimensions and materials of the workpieces. The angular position of the straight line 13 with respect to the feed direction 14 can therefore be used to control the materials processing operation.

A particularity in FIG. 2 is that the third, dark region, i.e., minimum region 11, comprises transition regions having sharp regional boundaries 10', 12'. These indicate that abnormal processing is taking place. A joint edge that has not yet been melted sufficiently by the laser beam is present at these locations.

The foregoing can be summarized as follows. It is essential to perform an analysis of instantaneous plasma intensities in three spatial regions 10, 11, 12 that are to be differentiated. Either these regions occur as clearly separate from one another, or one of the regions is completely absent. The shape and the relative position of each of these spatial regions having predetermined intensity values can be used to determine nearly all of the cited processing characteristics during the processing operation. The plane of observation is defined by locations at which light-sensitive pixels, for example a CCD camera, are arranged. Present within the plane of observation are spatially distributed intensity values: two maxima and a relative minimum. These extreme values lie approximately on the straight line 13 that may be inclined relative to the feed direction 14. Assigned to each extreme value is a spatially extensive region that contains the extreme value. The absolute maximum is always in the first region 10, which is always disposed forward of the laser beam axis 20 in the feed direction. The second maximum is located in the second region 12, which always trails behind the laser beam axis 20. When the relative minimum occurs, it is always in the dark third region 11 between the other two regions 10, 12.

The figures thereafter show representations similar to those of FIGS. 1 and 2 to explain welding procedures that are subject to error or are at least in need of control. All of the examples are based on the arrangement, depicted in FIG. 2, of two workpieces of 1.2 and 0.8 mm, respectively, having a gap 21 between them. The vertical coordinate y corresponds to feed direction 14 and the horizontal coordinate x is oriented transversely to feed direction 14. A region of measurement 23 can be seen to contain a minimum region 11, and maxima 24, 25 are present that are assigned to the peak-intensity regions 10, 12 depicted in FIGS. 1, 2. FIG. 3a' shows the intensity as a function of the transverse coordinate x assigned to the minimum 26, which is located approximately at the coordinate y=22. The symmetrical arrangement of the peak regions 10, 12 and thus the maxima 24, 25 with respect to each other and to minimum region 11 shows that the path of the laser beam axis has not deviated from the center of the seam.

Turning now to FIG. 3b, the first bright region 10 is interrupted at 27 in the region of joint edge 23. Thus the maximum is not very well defined. The second peak-intensity region 12, however, is duly defined and is still present on the full width of the weld seam. The existing deviations from the set values point to welding defects in the form of undercuts or seam breakdown. FIG. 3b shows a typical representation of a deviation of the path into the thick sheet metal. FIG. 3c is a representation corresponding to FIGS. 3a and 3b of a deviation of the path into the thin sheet metal. The maximum 24 of leading peak region 10 is fully defined, while region 12 disposed after the axis of the laser beam is interrupted. A corresponding phenomenon occurs in FIG. 3c', where the maximum 24 is fully defined, whereas region 12 exhibits reduced brightness.

If the gap width of gap 21 is smaller than the focal radius, then both joint edges can always be melted as long as there is suitably precise tracking of the laser beam. Both peak-intensity regions 10, 12 are essentially present in this case, as FIG. 4a shows. This figure does, however, show that defective welding is taking place, since both regions 10, 12 are partly darkened. FIG. 4b shows a representation with a single continuous peak-intensity region. This phenomenon can be observed when the width of gap 21 is greater than the focal radius. In this case, one edge of one workpiece remains completely unmelted and a loadable weld connection is not obtained.

FIGS. 5a, 5b illustrate examples of root penetrations of varying quality. FIG. 5a shows a good root penetration with a broad seam root. The minimum region 11 is clearly defined. Root penetration can be detected with certainty. Root penetration is also present in FIG. 5b, but the third region is not defined and thus cannot be detected metrologically, even though root penetration is present. However, this root penetration is of poor quality, since only a narrow seam root has been formed.

FIG. 6 shows, in a single illustration, nine regions 23 of the same vapor capillary detected metrologically. The photographs were taken at one-millisecond intervals. All of the regions 23 show clear images of a minimum region 11. Photographs 3 to 6 additionally show intensely radiating light spots 22, representing spatters that have developed as a result of the welding method.

To summarize: typical welding defects can be assigned in quality and quantity to deviations of the detected regions from the ideal shape described hereinabove.

A joint gap and irregularities in edge preparation can be recognized very clearly. The geometric shape of the dark third region, minimum region 11, can be observed for this purpose. If the shape of this region deviates from a near-circular shape and if sharp boundaries with respect to the brighter first and second regions 10, 12 can be recognized, then a joint edge that has not yet been melted by the laser beam is present at these locations in the region of observation. If the values of the joint gap are not too large, even though the first bright region 10 is clearly interrupted in the region of the joint edge, the bright second region 12 after the laser beam axis 20 can still be present on the full width of the weld seam. In this case, the process can still span the joint gap. However, deviations from the favorable predetermined values will cause welding defects in the form of undercuts or even seam breakdown due to inadequately melted material. If the values of the joint gap are too large, the bright second region 12 is also interrupted along the joint edge by the dark third region 11. In this case the joint gap can no longer be spanned by the process and the joint defects are fully developed. A temporal alternation between the two states can also occur if the width of the joint gap has reached a moderate yet critical value. In this case there are sporadically occurring connecting defects that will at least result in the formation of undercuts.

Undercuts: With increasing gap width and a simultaneous offset between the joint edge and a weld seam being produced, the brightest, first region 10 becomes asymmetrical, even to the point of the complete absence of one of the spatially separated maxima 15, 16 in the substructure of the first region 10. In the same gradual progression, undercuts form in the weld seam being produced.

Defect assignment: Undercuts do not occur as the result of just one cause. A gap 21 and an offset, among other causes, can lead to undercut formation. With the described method, not only can the defects themselves be recognized, but often their causes as well.

Irregular weld beads: If the method is performed in a disadvantageous manner, the process can alternate temporally between two states. This alternation does not necessarily cause any welding defects yet, but it does always lead to the development of undesirable irregularities in the upper and lower beads of the seam, and frequently also to spattering.

Spattering: If the deviations of the current process parameters from the favorable values become greater, then sporadically occurring, intensely radiating, small spots or "hot spots" are observed in addition to the three aforesaid regions of extreme values. These regions that "flare up" with additional brightness are associated with spatter during welding. In contrast to known monitoring methods, the method presented here makes it possible to detect not only the occurrence of spatters, but also their size and volume. The volume deficit for the weld seam is especially important in this regard.

Analysis: Since the assignment of simple geometrical shapes and relative brightness values of the detected image can reliably be assigned to the welding defects, an automated image processing modality can be used to analyze these data. Such modalities include neuronal networks, fuzzy logic, etc.

The method described hereinabove makes it possible to monitor technically relevant processing characteristics reliably during welding. These characteristics are:

the depth of penetration of the vapor capillary, to maintain minimum/maximum welding depths, the surface area of the vapor capillary on the upper side of the workpiece, to ensure adequate coverage of the joint gap by the weld seam, the width of the vapor capillary at a predetermined depth, so as not to fall short of the necessary bearing cross section of a weld joint, the surface area of the vapor capillary on the underside of the workpiece being welded, to maintain reliable root penetration and even to attain a set value for the root width of the weld seam, the lateral gap width between two horizontally adjacent workpieces must be tracked along the path of the weld to check for reliable bridging of the gap in the welding of a butt joint, the shape of the joint edge at the location of the vapor capillary, to correlate the effect of irregularities in edge preparation with the welding results. This is an additional problem of welding defect assignment, in order to ascertain the causes of welding defects, and the temporal stability of the vapor capillary, to detect droplet formation and spattering and their causes.

In addition, the methods described hereinabove are suitable in particular for the welding of thin, dissimilar workpieces, so-called tailored blanks. There are numerous variant applications, specifically wherever weld depth is of the same order of magnitude as seam width and root penetration or seam width must be detected reliably. The methods described hereinabove can be used in particular for laser-beam welding of autobody components in the automotive and component-supplier industries, for example in the production of tailored blanks of any desired contour. The aforesaid methods can further be used in the construction of apparatus for the electrical industry of chemical industry and in pipe fabrication.

If the measuring apparatus is integrated into the beam path of the processing system, the method can be used without problems in any situation where laser machining can be performed. The method is not limited by the choice of seam type and can also be used, for example, to monitor seal welds on lap seams.

What is claimed is:

1. A method for materials processing by plasma-inducing high-energy radiation, the method comprising the steps of:

directing plasma-inducing high-energy radiation in a first direction onto a material to be processed and establishing a vapor capillary in the material;

measuring simultaneously instantaneous intensity of the radiation within the vapor capillary in a plane of observation that is oriented transversely to the first direction and determining in the plane of observation spatial shapes of two spaced-apart peak-intensity regions (10,12) of the radiation emitted from the vapor capillary and of a minimum intensity region (11) that is formed between the two peak-intensity regions in the vapor capillary;

comparing the determined spatial shapes of the peak-intensity regions with predetermined region shapes; and controlling a materials processing operation as a function of deviations of the determined shapes from the predetermined region shapes.

* * * * *